United States Patent [19]

Uehara et al.

[11] Patent Number: 5,108,689

[45] Date of Patent: Apr. 28, 1992

[54] INJECTION MOLDING METHOD WITH COMPRESSION FOR HARDENING

[75] Inventors: Tadayoshi Uehara; Tatsuji Nakagawa; Yasuhiko Oyamada, all of Kanagawa, Japan

[73] Assignee: Aida Engineering Ltd., Kanagawa, Japan

[21] Appl. No.: 445,868

[22] PCT Filed: Jun. 1, 1988

[86] PCT No.: PCT/JP88/00536

§ 371 Date: Nov. 21, 1989

§ 102(e) Date: Nov. 21, 1989

[51] Int. Cl.⁵ .............................................. B29C 45/56
[52] U.S. Cl. ............................ 264/328.7; 264/328.13; 264/328.16; 425/150; 425/547; 425/589
[58] Field of Search ................ 264/2.2, 328.7, 328.13, 264/328.16; 425/150, 547, 548, 552, 555, 562, 589

[56] References Cited

U.S. PATENT DOCUMENTS 4,836,960 6/1989 Spector et al. ................... 264/328.7

FOREIGN PATENT DOCUMENTS

| 209628 | 1/1987 | European Pat. Off. . |
| 62-12019 | 1/1987 | Japan . |
| 62-23723 | 1/1987 | Japan . |
| 62-12019 | 3/1987 | Japan . |
| 62-60623 | 3/1987 | Japan . |
| 2027386 | 2/1980 | United Kingdom . |

Primary Examiner—Jill L. Heitbrink
Attorney, Agent, or Firm—Wenderoth, Lind & Ponack

[57] ABSTRACT

A predetermined amount of melted thermoplastic resin of raw material is injected into a molding space which is previously set to a temperature higher than that at which the resin beings to harden under atmospheric pressure and which has a capacity larger than a volume of a product. The injected resin is cooled in the molding space and pressurized before the resin is cooled to the temperature at which the resin begins to harden under atmospheric pressure. When pressurized, the glass transition temperature of the thermoplastic resin is shifted to a higher temperature so that the thermoplastic resin hardens in slight reduction of the temperature. The resin is cooled in the pressurized state until the resin possesses the dynamic rigidity under room temperature and atmospheric pressure. While the thermoplastic resin is further cooled to the extraction temperature, the pressure applied to the resin is controlled until a further increase of the dynamic rigidity due to the cooling ceases and the dynamic rigidity of the thermoplastic resin in the cooling is maintained to that under room temperature and atmospheric pressure.

3 Claims, 9 Drawing Sheets

INJECTION MOLDING METHOD WITH COMPRESSION FOR HARDENING

BACKGROUND OF THE INVENTION

1. Field of the Invention

The present invention relates to an injection molding method with compression and an apparatus therefor, and more particularly to an injection molding method and apparatus with compression suitable for molding a product such as, for example, an optical lens which requires high molding accuracy and uniformity in the compression thereof.

2. Description of the Prior Art

In order to obtain a precise molded product by using thermoplastic resin, the injection molding method with compression has lately attracted attention.

Thermoplastic resin such as, for example, PMMA (methacrylic resin) increases its dynamic rigidity to harden by cooling the thermoplastic resin from the melted state having a high temperature, and the volume of the resin is reduced with a decrease of the temperature.

More particularly, the thermoplastic resin, when cooled, hardens to from a solid product, while only simple cooling and hardening causes failures in the molded product such as shrinkage and warpage due to a decrease of the volume in the solid state thereof as compared with that in the melted state thereof.

Accordingly, a compression margin corresponding to the contraction rate in the molding is generally provided in the joint surface of the mold. Then, after injection of the melted thermoplastic resin into the mold, the thermoplastic resin is cooled to harden in the applied state with a mold clamping force.

Various process control methods for the injection molding with compression have been proposed heretofore. Basically, the temperature of the mold is previously set in the vicinity of the extraction temperature in order to increase the cooling efficiency and the mold is pressurized immediately after completion of the injection so that the capacity in the mold is equal to the volume of the molded product under the normal temperature and pressure. Then, the pressurized force is controlled to be gradually reduced with the contraction due to the cooling.

Namely, in the conventional process control, in order to improve the shape and dimensions effected by the contraction due to cooling, the pressure applied to the mold is controlled so that the thermoplastic resin to be molded maintains the volume under room temperature and atmospheric pressure in the whole range of temperature in the cooling. Thus, a satisfactory molded product can be obtained with stability of the shape and dimension.

The dynamic rigidity of the thermoplastic resin does not increase uniformly from the melted state thereof of a high temperature to the solidified state of room temperature and suddenly increases and hardens from a certain temperature (the glass transition point Tg).

Accordingly, if any deviation in the temperature occurs in each portion of the thermoplastic resin upon exceeding the glass transition point in the cooling, partially solidified portions and partially melted portions are mixedly produced in the thermoplastic resin in the molding space due to the deviation in the temperature. If the solidified portions and the melted portions are continuously pressurized uniformly, the solidified portions are apt to be subjected to plastic deformation and the inner composition of the molded product is liable to lack uniformity.

It is a matter of course that if the temperature of the mold is previously set to a high temperature and the mold is cooled for a sufficient time, since the temperature deviation in each portion of the resin is reduced, the above problems are alleviated to a certain extent. In the case of the molded product having a large size in the dimension or a partially large difference in thickness, if the resin in the mold is cooled slowly so that the temperature deviation does not occur, the operation efficiency is greatly deteriorated.

SUMMARY OF THE INVENTION

It is an object of the present invention to provide a novel injection molding method and apparatus with compression which can produce a molded product with excellent uniformity in the inner composition without a large temperature deviation in each portion of resin even if a time required to harden the resin, particularly a time required to exceed the glass transition point is shortened.

As described above, thermoplastic resin such as PMMA possesses a property that the dynamic rigidity thereof is increased as the resin is cooled so that the resin hardens and particularly the dynamic rigidity is suddenly increased upon exceeding the glass transition point. Furthermore, the thermoplastic resin of this kind possesses a property that the dynamic rigidity thereof is increased and the glass transition point is shifted to a higher temperature by increasing a pressurized force thereto even if the temperature of the resin is the same.

This means that the thermoplastic resin such as PMMA hardens at a relatively high temperature (for example, 125° C. in which the resin is in the melted state under atmospheric pressure) when the thermoplastic resin is pressurized with high pressure.

The present invention has been made by utilization of the property that the resin hardens at a high temperature when pressurized.

More particularly, in the present invention, the melted thermoplastic resin injected in the molding space is pressurized to be hardened so that the resin is substantially completely hardened in the range of a slight variation of temperature and consequently the temperature deviation in each portion of the resin in hardening is reduced.

Generally, the present invention is premised on the injection molding method with compression in which a predetermined amount of melted thermoplastic resin is injected into a metal mold formed with a molding space and the resin is cooled to obtain a molded product while controlling a pressure applied to the injected thermoplastic resin in the metal mold.

The metal mold means comprises a stationary metal mold and a movable metal mold opposed to each other. The movable metal mold can move among a first position in which the movable mold cooperates with the stationary mold to form a molding space substantially identical with the volume of the product, a second position in which the movable mold cooperates with the stationary mold to form a molding space larger than the volume of the product and a third position in which the movable mold is separated from the stationary mold.

Prior to the injection operation, the movable mold moves to the second position to form the molding space larger than the volume of the product. Furthermore, the temperature of the metal mold is initially set to a temperature higher than a temperature at which temperature the thermoplastic resin begins to harden under atmospheric pressure by a temperature control means.

The melted thermoplastic resin is measured by measuring and injecting means and a predetermined amount thereof is injected into the molding space through a gate means. The injected resin is rapidly cooled to the initially set temperature of the mold by heat exchange with the mold.

A pressure control means increases the pressure applied to the thermoplastic resin in the metal mold before the injected thermoplastic resin is cooled to the temperature at which temperature the resin begins to harden under atmospheric pressure. Since the temperature of the metal mold is previously set to a temperature which is higher than the temperature at which temperature the resin begins to harden under atmospheric pressure, the thermoplastic resin in the mold is maintained in the melted state in the beginning of the application of the pressure and accordingly the pressurizing force is uniformly applied to the whole of the thermoplastic resin in the mold.

As described above, the thermoplastic resin possesses the property that the dynamic rigidity thereof is increased so that the resin is hardened when the pressurizing force is increased even without a reduction of the temperature of the resin.

Accordingly, if the thermoplastic resin is applied with the pressurizing force capable of obtaining the dynamic rigidity larger than that of the glass transition point under the temperature condition in the beginning of the application of the pressure, the thermoplastic resin is hardened from the beginning of the application of the pressure without a reduction of the temperature (or with slight reduction of the temperature) and the dynamic rigidity thereof becomes larger than that of the glass transition point so that the resin is hardened.

Furthermore, in this manner, when the thermoplastic resin in the melted state is hardened by the application of the pressure, the deviation of the pressurizing force and the deviation of the temperature in each portion of the resin in the hardening process are extremely small.

The thermoplastic resin hardened by application of the pressure is cooled to the temperature at which temperature the dynamic rigidity under room temperature and atmospheric pressure is obtained while maintaining the pressurizing force.

Since the thermoplastic resin hardened in the pressurized state has a temperature at which temperature the resin is still melted under atmospheric pressure, the dynamic rigidity thereof is reduced and the resin is softened if the pressurizing force is reduced. However, as described above, the thermoplastic resin of this kind possesses a property that the dynamic rigidity thereof is increased as the resin is cooled.

Accordingly, the temperature control means reduces the temperature of the mold gradually to cool the thermoplastic resin hardened by the application of the pressure to the extraction temperature and the pressure control means reduces the pressurizing force so that increase of the dynamic rigidity due to cooling is canceled. Thus, the thermoplastic resin is molded while maintaining the dynamic rigidity under room temperature and atmospheric pressure.

DESCRIPTION OF THE PREFERRED EMBODIMENT

An embodiment of the present invention is now described in detail with reference to drawings.

Figure 1:
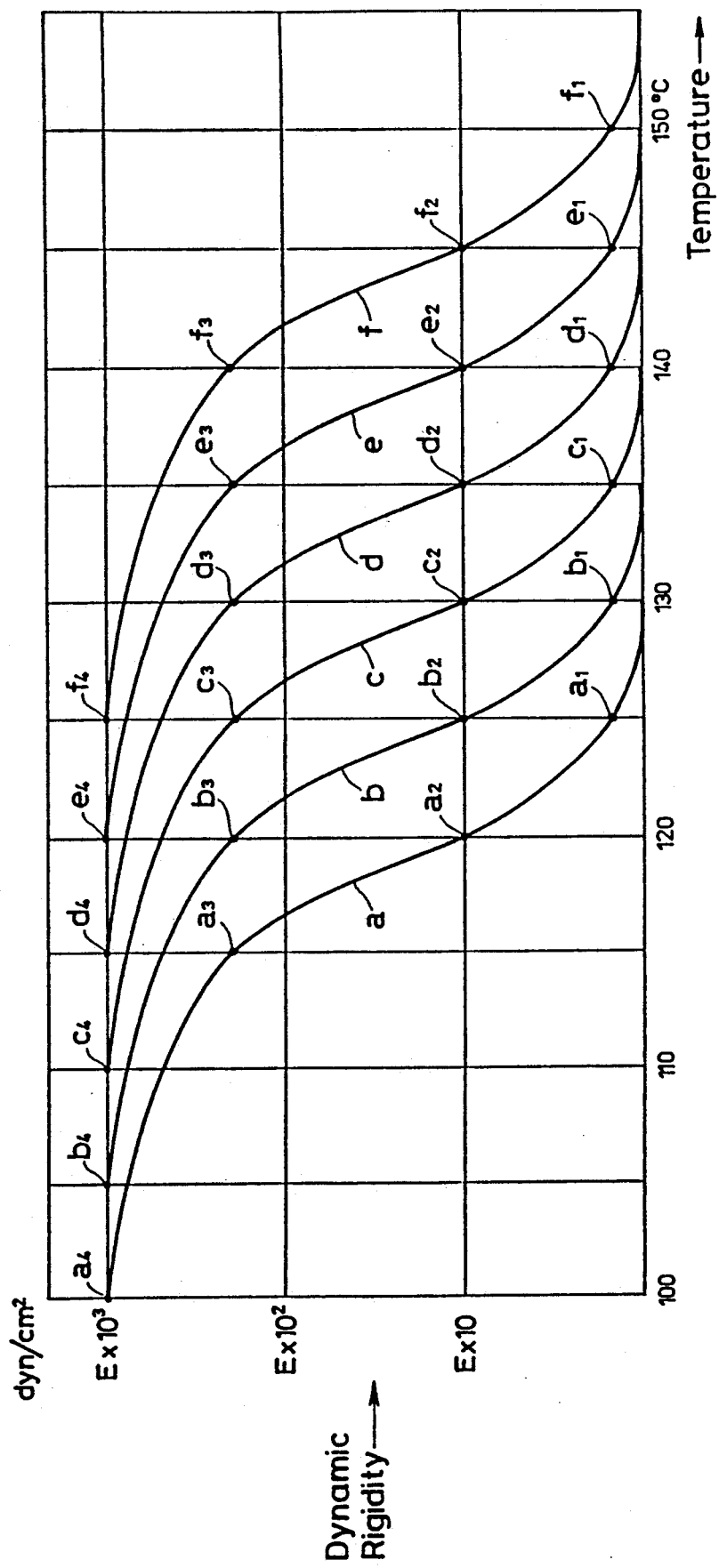
FIG. 1 is a characteristic diagram showing the relationship of the temperature and dynamic rigidity of PMMA of an example of a thermoplastic resin using pressure as a parameter.

FIG. 1 shows the relationship of the temperature and dynamic rigidity of PMMA of a an example of thermoplastic resin using pressure as a parameter.

FIG. 1, curves a, b, c, d, e and f show the relationship of temperature and dynamic rigidity at 1, 200, 400, 600, 800 and 1000 bars, respectively. The curve showing the relationship of the temperature and the dynamic rigidity of PMMA is shifted to a higher temperature by 0.025° C. each time the pressure increases by 1 bar.

Furthermore, in FIG. 1, points $a_1$, $b_1$, $c_1$, $d_1$, $e_1$ and $f_1$, are points in which PMMA begins to harden at each of the corresponding pressures; points $a_2$, $b_2$, $c_2$, $d_2$, $e_2$ and $f_2$ are points in which PMMA hardens to a state before the glass transition point at each of corresponding pressures; points $a_3$, $b_3$, $c_3$, $d_3$, $e_3$ and $f_3$ are points in which PMMA hardens to a state exceeding the glass transition point at each of corresponding pressures, and points $a_4$, $b_4$, $c_4$, $d_4$, $e_4$ and $f_4$ are points in which PMMA hardens completely at each of corresponding pressures.

Under the condition of a pressure of 1 bar, PMMA is in the completely melted state in the temperature range exceeding 130° C.; it begins to harden at about 125° C. when cooled, the dynamic rigidity just before the glass transition point is obtained at 120° C.; the dynamic rigidity exceeding the glass transition point is obtained at 115° C., and PMMA hardens completely at about 100° C.

On the other hand, under the condition of a pressure of 1000 bars; PMMA is in the completely melted state in the temperature range exceeding 155° C.; it begins to harden at about 150° C. when cooled; the dynamic rigidity just before the glass transition point is obtained at 145° C.; the dynamic rigidity exceeding the glass transition point is obtained at 140° C., and PMMA hardens completely at about 125° C.

Namely, a thermoplastic resin such as PMMA completely hardens even under a relatively high temperature when the resin is in a high pressure state. Accordingly, the present invention has been made by utilization of the property of the thermoplastic resin that the resin is hardened by application of pressure.

In the present invention, the temperature of the metal mold is initially set to a temperature higher than a at which temperature the thermoplastic resin begins to harden under atmospheric pressure and the thermoplastic resin is maintained in the melted state upon the completion of injection.

After the completion of the injection, the thermoplastic resin is pressurized to be hardened at a high temperature and the resin hardened by the application of pressure is cooled. At the same time as the cooling, the pressure applied to the thermoplastic resin is controlled so that the dynamic rigidity of the thermoplastic resin during cooling is maintained conatant. Namely, the temperature and the pressure are controlled to cool the thermoplastic resin so that the dynamic rigidity of the resin under room temperature and atmospheric pressure is maintained.

Figure 2:
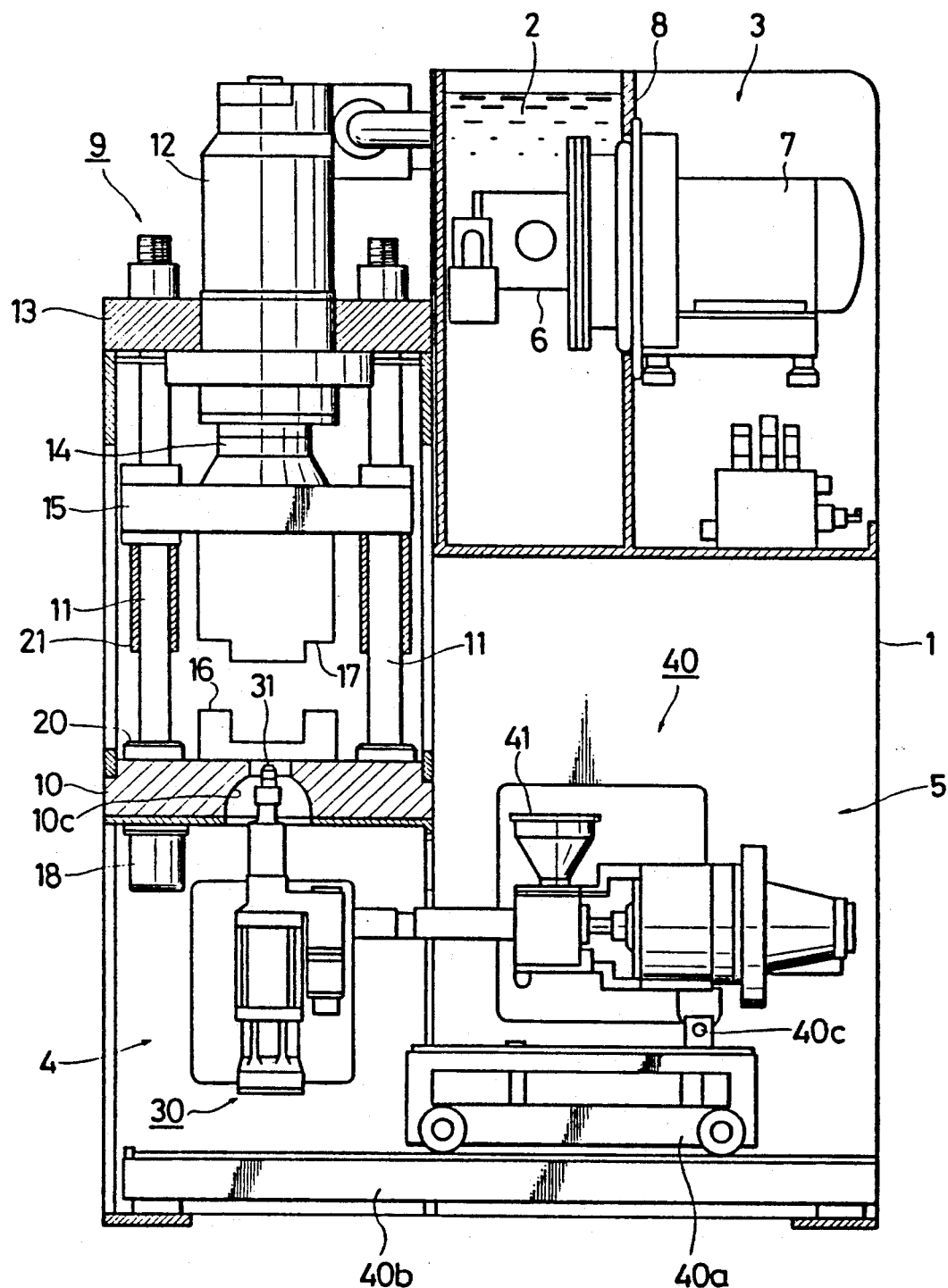
FIG. 2 is a sectional view of an injection molding apparatus with compression of a direct pressure type according to an embodiment of the present invention.

FIG. 2 is a sectional view of the injection molding apparatus with compression according to an embodiment of the present invention.

The injection molding apparatus according to the present invention is formed with a frame 1 in the form of a box in a whole configuration and the frame 1 is divided into chambers 2, 3, 4 and 5 by partition walls.

The chamber 2 constitutes an oil tank which is filled with oil and in which an oil hydraulic pump 6 is contained.

The chamber 3 contains a motor 7 for driving the oil hydraulic pump 6, which is coupled with the motor 7 through a through hole formed in a partition wall 8 between the chambers 2 and 3. The oil hydraulic pump 6 and the motor 7 constitute a known oil hydraulic unit to feed oil to all oil hydraulic devices.

A mold clamping device 9 is mounted above the chamber 4.

A stationary die-plate 10 is fixedly mounted on the upper wall of the chamber 4. A cylinder fixing plate 13 on which a mold clamping cylinder 12 is mounted is fixedly mounted at upper ends of tie-bars 11 fixed vertically in four corners of the stationary die-plate 10. A movable die-plate 15 is mounted to a piston rod 14 of the mold clamping cylinder 12 to be able to move up and down along the tie-bars 11.

Furthermore, a stationary metal mold 16 is exchangeably mounted on the stationary die-plate 10 and a movable metal mold 17 is also exchangeably mounted to the movable die-plate 15.

Compression margin forming cylinders 18 which form a predetermined compression margin in the joint surface of the mold between the stationary and movable molds before the injection operation are provided in each of the tie-bars 11. The compression margin means a gap formed previously in the joint surface of the mold in consideration of reduction of the volume of the resin which occurs when the melted resin is compression molded.

Figure 3:
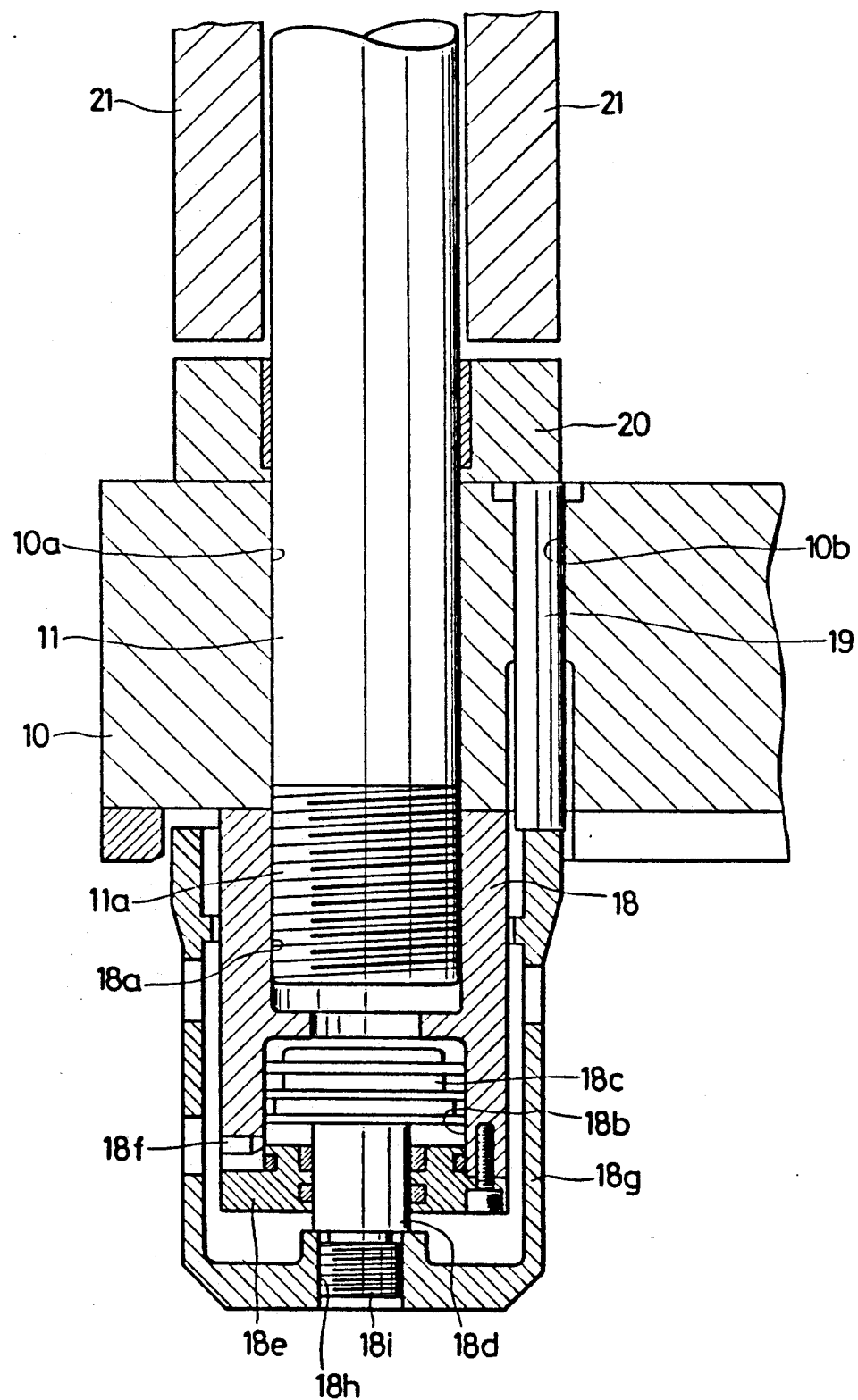
FIG. 3 is a sectional view of a compression margin adjustment cylinder of an example of molding space expansion means.

FIG. 3 is an enlarged sectional view showing the compression margin adjusting cylinder 18, in which the same elements as those of FIG. 2 are given the same numerals.

A bolt or thread 11a is formed at the lower end of the tie-bar 11 and penetrates a through hole 10a formed in the stationary die-plate 10. A nut 18a which is fitted onto the bolt 11a is formed in the upper surface of the compression margin adjusting cylinder 18. The bolt 11a is turned tightly into the nut 18a so that the tie-bars 11 and the adjusting cylinder 18 are fixed to the stationary die-plate 10.

A chamber 18b is formed in the lower portion of the adjusting cylinder 18 and a piston 18c is disposed in the chamber 18b so that the piston 18c can move vertically. A lower opening of the chamber 18b is closed by a cap 18e having a through hole which a piston rod 18d penetrates slidably. Numeral 18f denotes a port of the adjusting cylinder 18.

A bottomed cylindrical case 18g includes a nut 18h formed in the central bottom of the case 18g. The nut 18h is fitted onto a bolt 18i formed in the lower end of the piston rod 18d.

A pin 19 is inserted into a guide hole 10b formed in the stationary die-plate 10 vertically movably and a lower end of the pin 19 is supported on an upper end surface of the case 18g.

A spacer ring 20 is mounted around the tie-bar 11 so that the ring 20 can move up and down along the tie-bar 11. Accordingly, when oil is fed through the port 18f to move back the piston 18c into the chamber 18b, the piston rod 18d, the case 18g, the pin 19 and the spacer ring 20 are integrally moved up.

On the other hand, cylindrical intermediate members 21 are fixedly mounted in the lower surface of the movable die-plate 15 to cover the outer periphery of the tie-bars 11. Thus, when the spacer ring 20 is pushed up as described above, the movable die-plate 15 is also pushed up together with the intermediate members 21 to form a compression margin. The intermediate members 21 have a length which is sufficient so as not to prevent the mold clamping operation when the spacer ring 20 is lowered and to form the compression margin when the spacer ring 20 is moved up.

The compression margin adjusting cylinder 18 and its associated mechanism serve to set a precise compression margin in order to obtain a precise molded product.

More particularly, the piston rod 14 is advanced to minimize the compression margin to zero. At this condition, when the compression margin adjusting cylinder 18 is moved against the mold clamping cylinder 12, a predetermined compression margin is formed. After the compression margin reaches a set value, thermoplastic resin is injected into the mold. After completion of the injection, the pressure applied to the adjusting cylinder 18 is reduced and the piston rod 14 is advanced so that the mold clamping operation is performed.

The present embodiment is characterized in that an oil hydraulic circuit communicating with the port 18f of the adjusting cylinder 18 is completely closed at the timing when the compression margin reaches the set value so that the adjusting cylinder 18 functions substantially in the same manner as a so-called mechanical lock to thereby fix the compression margin precisely.

Accordingly, a valve mechanism for operating the compression margin adjusting cylinder 18 is required to be able to control a small amount of flow and have a high speed responce upon closure.

Figure 4:
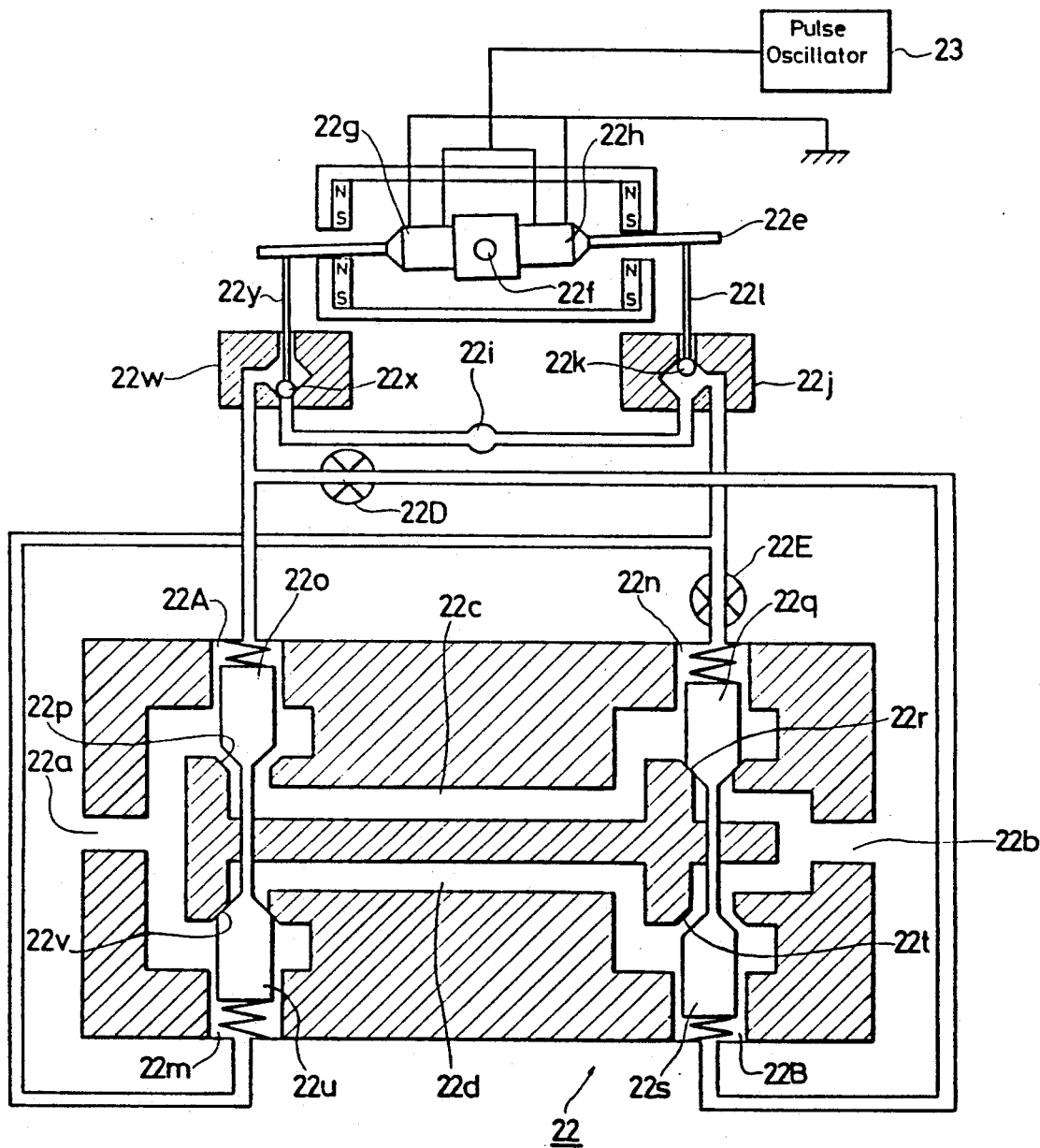
FIG. 4 is a sectional view showing an example of a valve mechanism for driving the compression margin adjustment cylinder shown in FIG. 3.

FIG. 4 is a sectional view showing an example of the valve mechanism for operating the compression margin adjusting cylinder 18. The valve mechanism 22 discharges oil stepwise in response to pulses produced from a pulse oscillator 23.

The valve mechanism 22 shown in FIG. 4 includes flow ways 22c and 22d formed in parallel with each other between an inlet 22a and an outlet 22b and is adapted to pass oil by opening the flow ways 22c and 22d alternately for a short time in synchronism with the pulses produced from the pulse oscillator 23.

More particularly, a drive pin 22e made of soft magnetic iron is swingably supported by an axis 22f in a magnetic field. Each time the pulses of the oscillator 23 are supplied to coils 22g and 22h wound around the drive pin 22e, the polarity of the drive pin 22e is reversed so that the pin is swung.

In the state shown in FIG. 4, a ball 22k in a pilot valve 22j is pushed up together with a pin 22l by pilot pressure, supplied from a pilot pressure source 22i and the pilot pressure is supplied to pressure chambers 22m and 22n.

Accordingly, since a poppet 22o opens a valve seat 22p while a poppet 22q closes a valve seat 22r, the flow way 22c is closed as a whole. Furthermore, since a poppet 22s opens a valve seat 22t while a poppet 22u closes a valve seat 22v, the flow way 22d is closed as a whole. Oil does not flow from the inlet 22a to the outlet 22b.

In this state, when the polarity of the pulses produced from the pulse oscillator 23 is reversed, the drive pin 22e is rotated clockwise in the figure since the right and left polarities of the drive pin 22e are reversed. Accordingly, a ball 22x in a pilot valve 22w is pushed up together with a pin 22y by pilot pressure supplied from the pilot pressure source 22i and the pilot pressure is supplied to pressure chambers 22A and 22B.

Thus, the pilot pressure supplied to the pressure chamber 22A causes the poppet 22o to close the valve seat 22p and the poppet 22u to open the valve seat 22v while the pilot pressure supplied to the pressure chamber 22B causes the poppet 22s to close the valve seat 22t and the poppet 22q to open the valve seat 22r. However, since an orifice 22D is provided between the pilot valve 22w and the pressure chamber 22B, a time delay occurs from the opening of the valve seat 22v by the poppet 22u to the closure of the valve seat 22t by the poppet 22s, oil flows through the flow way 22d from the inlet 22a to the outlet 22b.

When the polarity of the pulses produced from the pulse oscillator 23 is reversed again, the pilot pressure is supplied to the pressure chambers 22m and 22n again and the valve mechanism 22 is returned to the state shown in FIG. 4. However, since an orifice 22E is provided between the pilot valve 22j and the pressure chamber 22n, a time delay occurs from the opening of the valve seat 22p by the poppet 22o to the closure of the valve seat 22r by the poppet 22q. The flow way 22c is opened during the time delay and accordingly oil flows through the flow way 22c from the inlet 22a to outlet 22b.

In this manner, since the valve mechanism shown in FIG. 4 causes oil to flow from the inlet 22a to the outlet 22b only during the time delay set by the orifices 22D and 22E each time the polarity of the pulses produced from the oscillator 23 is reversed, the rate of flow is controlled exactly as a whole in accordance with a frequency of the pulse and the oil hydraulic circuit extending from the inlet 22a to the outlet 22b is completely closed by means of the poppets by ceasing the pulse oscillator 23 to thereby satisfy the requirement of the present invention.

In FIG. 2, numeral 30 denotes a measuring and injecting device which includes a nozzle directed upward. Numeral 40 denotes a plasticizing device which plasticizes resin of raw material to feed in to the measuring and injecting device 30. The measuring and injecting device 30 is disposed in the chamber 4 and the plasticizing device 40 is disposed in the chamber 5. The device 30 is coupled with the plasticizing device 40.

In the embodiment, the plasticizing device 40 is put on a truck 40a. The plasticizing device 40 moves together with the measuring and injecting device 30 along a rail 40b and rotates about an axis 40c on a vertical plane. A nozzle 31 is positioned in accordance with the movement of the truck 40a and is coupled with a sprue bush 10c of the stationary die-plate 10 by the rotation about the axis 40c.

Figure 5:
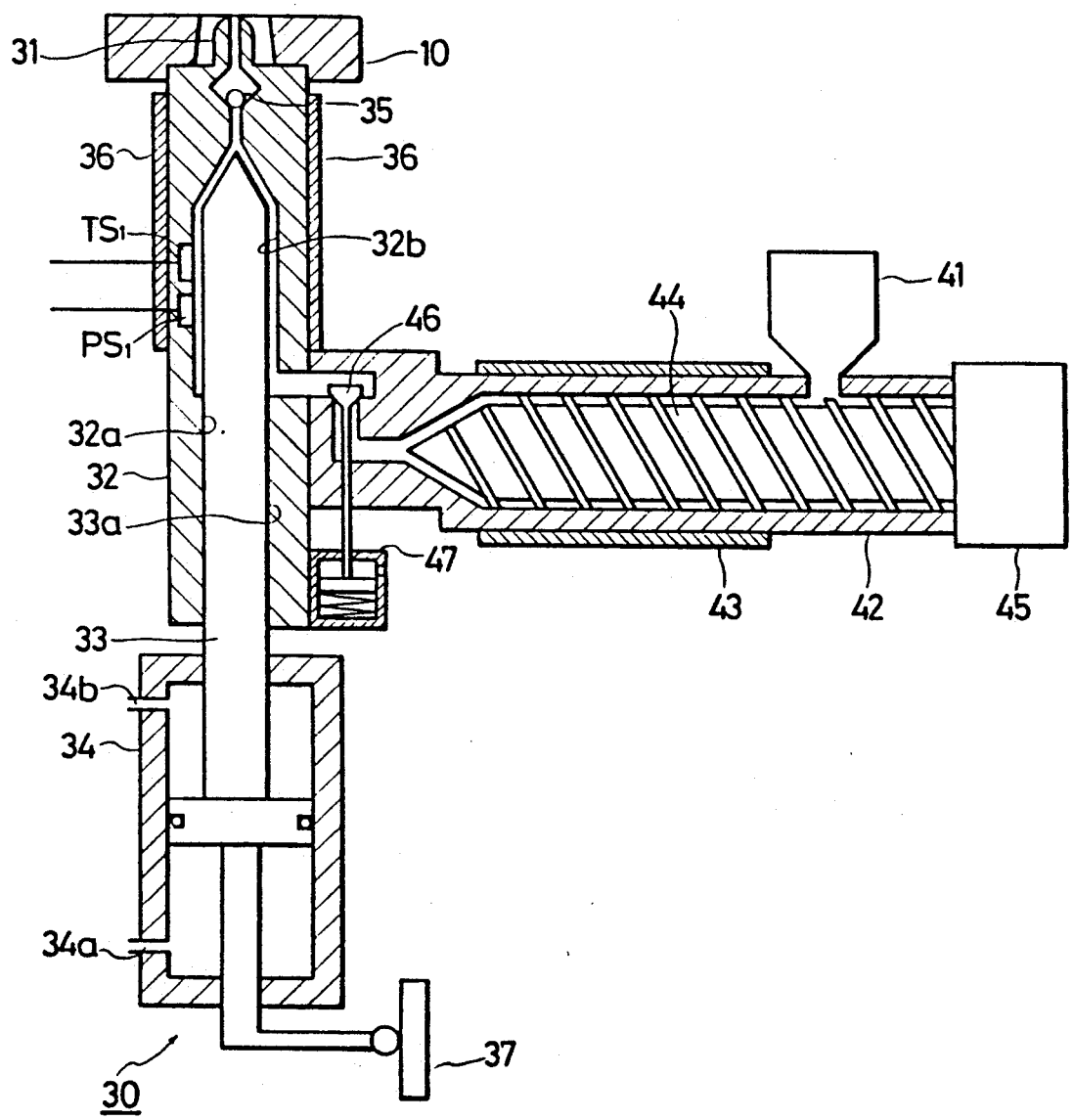
FIG. 5 is a sectional view showing an example of a plasticization device and a measuring and injecting device.

The measuring and injecting device 30, the plasticizing device 40 and the associated mechanism thereof are required to be able to measure the resin melted in the proper temperature exactly and inject the melted resin. FIG. 5 shown in section an actual example of the measuring and injecting device 30 and the plasticizing device 40.

In FIG. 5, the same elements as those described above are given the same numeral as that of the elements described above.

A plunger 33 is inserted into a lower opening of an injection cylinder 32 and is moved up and down by oil hydraulic cylinder 34.

A check valve 35 is provided in a tip of the injection cylinder 32.

An inner diameter of a lower inner periphery 32a of the injection cylinder 32 positioned near the oil hydraulic cylinder 34 is smaller than that of an upper inner periphery 32b thereof positioned near the nozzle 31 and a step is formed between the lower inner periphery 32a and the upper inner periphery 32b of the injection cylinder 32. The lower inner periphery 32a of the injection cylinder 32 and an outer periphery 33a of the plunger 33 are sealed each other. A gap is formed between the upper inner periphery 32b and the outer periphery of the plunger 33 and the plasticized resin flows through the gap into the injection cylinder 32.

The plunger 33 is moved by a difference between a pressure of the resin in the injection cylinder 32 and a pressure of the oil hydraulic cylinder 34.

Numeral 36 represents a heater for heating the injection cylinder 32, $TS_1$ represents a temperature sensor which detects a temperature of the resin in the injection cylinder 32, and $PS_1$ represents a pressure sensor which detects a pressure in the injection cylinder 32. Numeral 37 represents a position sensor of, for example, an optical type which detects a backward distance of the plunger 33. An amount of resin injected at one injection operation is measured on the basis of outputs of the temperature sensor $TS_1$, the pressure sensor $PS_1$ and the position sensor 37. As long as the position sensor 37 can detect the backward distance of the plunger 33, the disposition thereof is not limited to the position shown in FIG. 5.

The plasticizing device 40 serves to melt the resin of raw material fed into a plasticizing cylinder 42 through a hopper 41 by heating it by the heater 43. A screw 44 is rotated by an oil hydraulic motor 45.

A poppet 46 is disposed in the flow path of the resin extending from the plasticizing cylinder 42 to the injection cylinder 32 and is driven by a cylinder 47 to open and close the flow path between the plasticizing cylinder 42 and the injection cylinder 32.

The mechanism described above is controlled by a system as shown in FIG. 6, for example.

Figure 6:
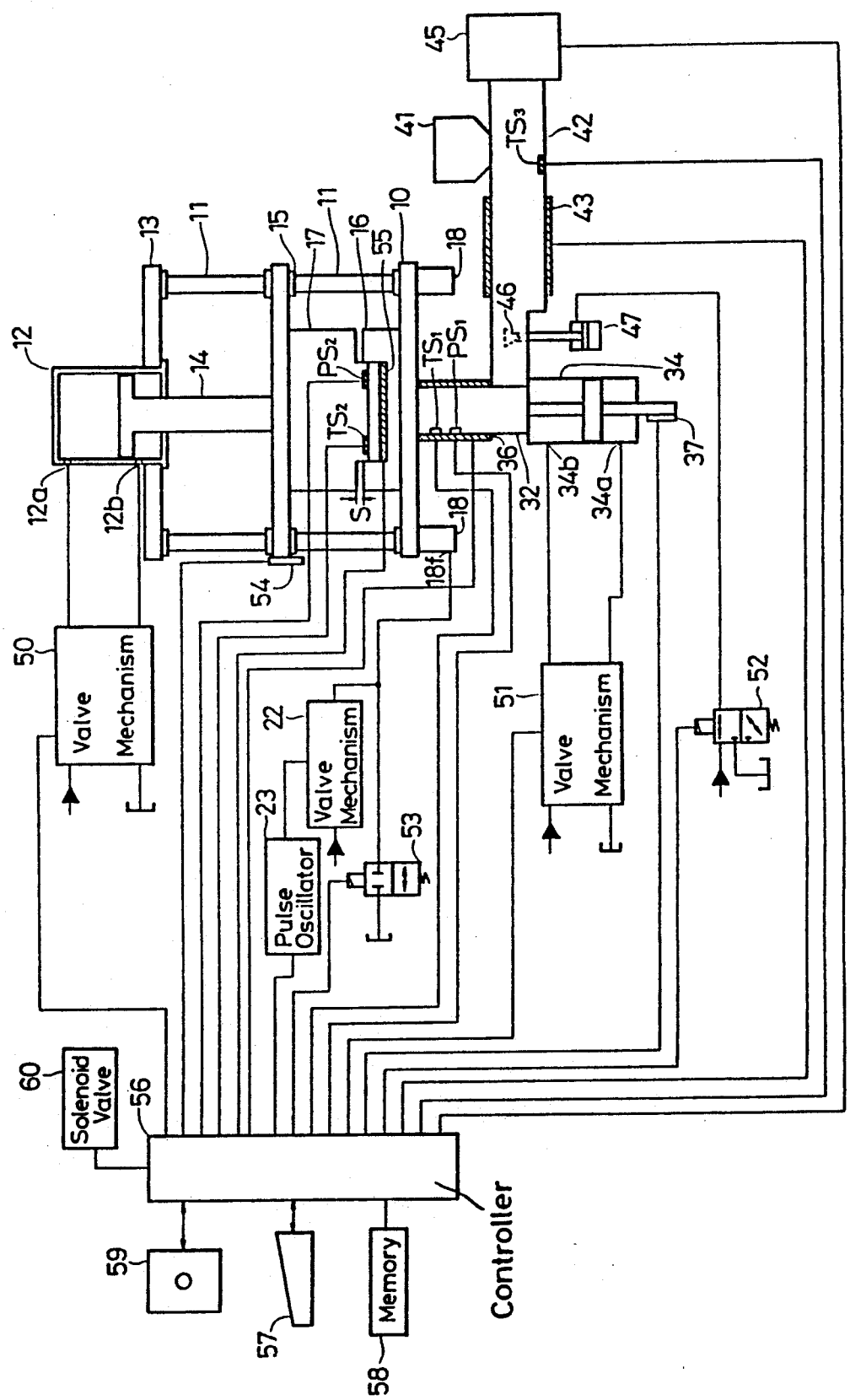
FIG. 6 is a circuit diagram showing an example of a control system of the present invention.

In FIG. 6, the elements described above are given the same numeral as those described above and description thereof is omitted. Only elements which are not described above are described.

Numeral 50 denotes a valve mechanism including a known servo-valve of an electric-to-hydraulic conversion type and a known pressure control valve. The valve mechanism 50 is coupled with ports 12a and 12b of the mold clamping cylinder 12. A piston rod 14 is advanced by feeding oil to the port 12a through the valve mechanism 50.

Similarly, numeral 51 denotes a valve mechanism including a known servo-valve of an electric-to-hydraulic conversion type and which is coupled with ports 34a and 34b of the injection cylinder 14. The injection operation is performed by feeding oil to the port 34a through the valve mechanism 51.

Numeral 52 denotes a directional control valve of the solenoid control type which is employed to feed oil to the cylinder 47, which is coupled with any of a pressure source or a drain in accordance with a condition of the directional control valve 52.

Numeral 53 denotes a shutoff valve for shutting off the oil hydraulic circuit of the compression margin forming cyrender 18.

Numeral 54 denotes a photointerrupter constituting an example of a sensor for detecting the compression margin. Pulses produced from the photointerrupter 54 in accordance with backward movement of the movable die-plate 15 are supplied to a controller 56.

Numeral 55 denotes a heater which is used to determine a temperature of the resin in the metal mold. The composition and the shape of the heater 55 is different depending on the shape of the metal mold. Numeral 57 denotes a known input device, 58 a memory and 59 an auxiliary memory.

$TS_2$ is a temperature sensor for detecting a temperature of the resin in the mold, $PS_2$ is a pressure sensor for detecting a pressure of the resin in the mold, and $TS_3$ is a temperature sensor for detecting a temperature of the resin in the plasticizing cylinder 42.

Further, numeral 60 denotes a solenoid valve which seals a gate provided in the mold 16. A more actual configuration is shown in an enlarged view of FIG. 7.

The solenoid valve 60 is coupled with a cylinder 61. The cylinder 61 advances a rod 62 in responce to excitation of the solenoid valve 60 to seal the gate and the cylinder 61 move the rod 62 back in response to deenergization of the solenoid valve 60 to open the gate.

The operation of the embodiment is described below with reference to the foregoing.

Figure 9:
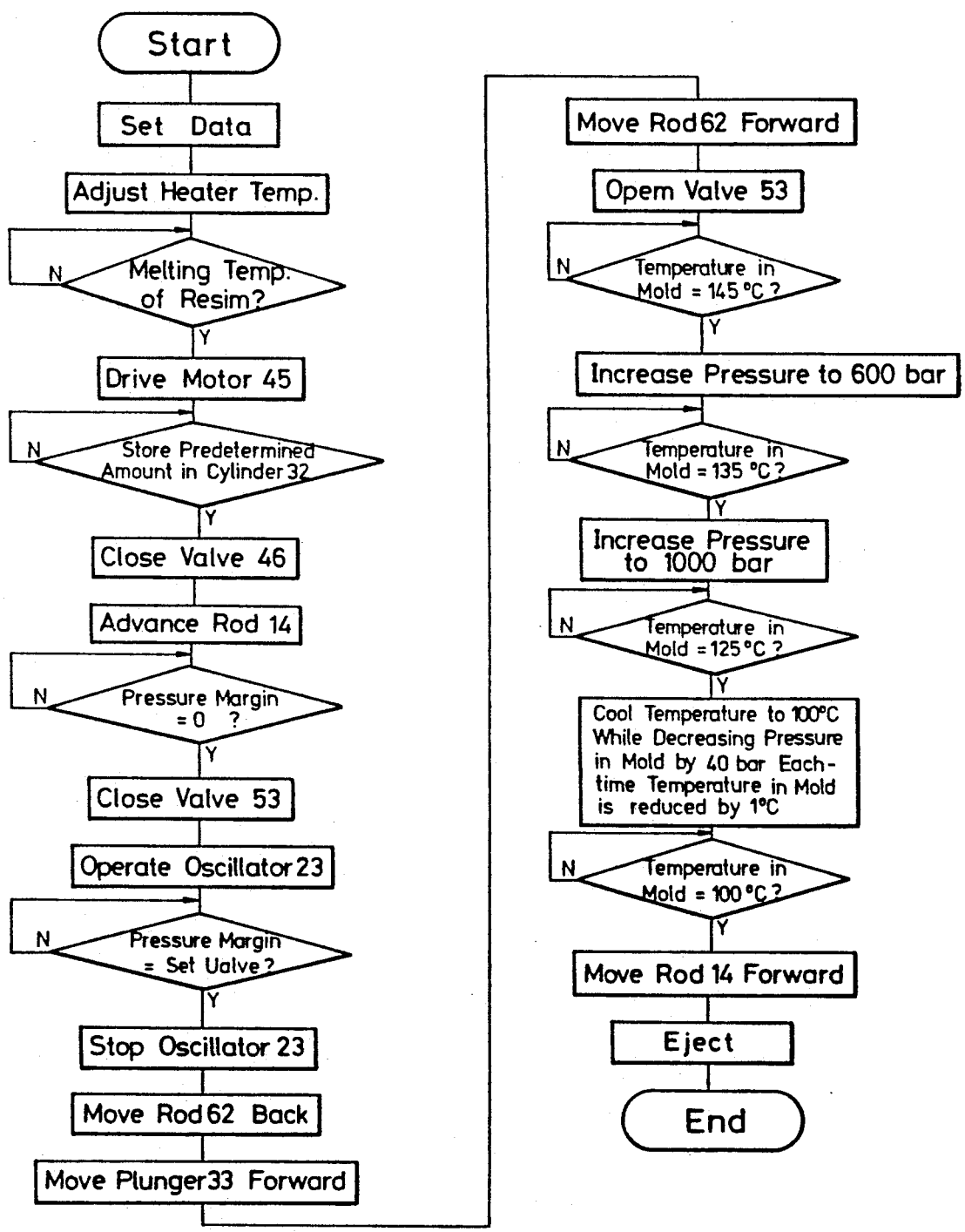
FIG. 9 is a flowchart showing the operation of the present invention.

The operation of the injection molding apparatus with compression according to the present embodiment is divided into (1) the plasticizing operation of resin by the plasticizing cylinder 42, (2) the compression margin forming operation by the mold clamping cylinder 12 and the compression margin forming cylinder 18, (3) the injection operation by the injection cylinder 32 and (4) the compression molding operation by the mold clamping cylinder 12 and the metal molds 16, 17. The operation is described in the order described above. The flowchart shown in FIG. 9 would facilitate the understanding of the operational sequence.

First of all, various data such as, for example, a temperature of resin before injection, an amount of resin injected by one molding operation, an injection pressure, an injection speed, the magnitude of the compression margin, a series of data concerning temperature in the metal mold, a series of data concerning the mold clamping force and the like are inputted from the input device 57 and stored in the memory 58 and the auxiliary memory 59.

The heater 43 is set to 190° C. which is the temperature of PMMA which is to be injected.

In the initial state, the controller 56 releases excitation of the directional control valve 52 so that the cylinder 47 is coupled to the drain through the directional control valve 52.

Accordingly, the poppet 46 opens to connect the plasticizing cylinder 42 to the injection cylinder 32.

The PMMA fed from the hopper 41 is heated by the heater 43 and is melted.

When the temperature sensor $TS_3$ detects that a temperature of the PMMA in the cylinder 42 has reached 190° C., the controller 56 drives the motor 45 to rotate the screw 44.

At this time, the valve mechanism 51 keeps the balance of pressure between the ports 34a and 34b of the oil hydraulic cylinder 34. Accordingly, the plunger 33 can move up and down freely in the injection cylinder 32 in accordance with the external pressure.

In the initial state, since the solenoid valve 60 is excited and the rod 62 seals the gate, the melted PMMA flows from the plasticizing cylinder 42 into the injection cylinder 32 in response to the rotation of the screw 44 and the plunger 33 is moved back.

As the injection cylinder 32 is filled with PMMA, the plunger 33 is moved back and the backward amount thereof is detected by the position sensor 37. When the controller 56 judges that a predetermined amount of PMMA is stored in the injection cylinder 32 by the fact that the output of the position sensor 37 reaches a predetermined reference value, the controller 56 excites the directional control valve 52.

The cylinder 47 is coupled with the pressure source in response to the excitation of the directional control valve 52 and the shutoff valve closes between the plasticizing cylinder 42 and the injection cylinder 32. Thus, the predetermined amount of PMMA is stored in the injection cylinder 32.

As described above, in the embodiment, it is detected by the output of the position sensor 32 that the predetermined amount of PMMA is filled in the injection cylinder 32, while the volume of PMMA varies slightly depending on temperature and pressure.

Accordingly, in the embodiment, the condition for operating the cylinder 47 is corrected by the output of the pressure sensor $PS_1$ and the temperature sensor $TS_1$.

More particularly, the volume of PMMA is reduced as the pressure applied thereto is increased. Accordingly, the controller 56 attains correction so that the reference value with respect to the detected output of the position sensor 37 is reduced as the detected pressure of the pressure sensor $PS_1$ is increased while the reference value with respect to the detected output of the position sensor 37 is increased as the detected pressure of the pressure sensor $PS_1$ is decreased.

Further, the volume of PMMA is reduced as the temperature thereof is lower. Accordingly, the controller 56 attains correction so that the reference value with respect to the detected output of the position sensor 37 is reduced as the detected temperature of the temperature sensor $TS_1$ is lowered while the reference value with respect to the detected output of the position sensor 37 is increased as the detected temperature of the temperature sensor $TS_1$ is raised.

When the predetermined amount of PMMA is filled in the injection cylinder 32 in the manner described above, the controller 56 controls the compression margin forming operation.

In the embodiment, since the compression margin adjusting cylinder 18 forms the compression margin against the mold clamping cylinder 12, the valve mechanisms 50 and 22 are adjusted so that a relationship of $P_1 \cdot A_1 < P_2 \cdot A_2$ is satisfied and a difference of the relationship is extremely small where the inner diameter of the mold clamping cylinder 12 is $A_1$, the oil pressure thereof is $P_1$, the inner diameter of the compression margin adjusting cylinder 18 is $A_2$, and the oil pressure thereof is $P_2$.

Furthermore, the shutoff valve 53 is deenergized to open the port 18f of the compression margin adjusting cylinder 18. The pulse oscillator 23 ceases the oscillation operation thereof.

In this state, the controller 56 operates the valve mechanism 50 to feed oil to the port 12a. At this time, since the pressure in the compression margin adjusting cylinder 18 is reduced, the piston rod 14 is advanced and the compression margin s between the movable mold 17 and the stationary mold 16 is minimized to zero so that the force of $P_1 \cdot A_1$ is applied to the joint surface between the movable mold 17 and the stationary mold 16.

When the compression margin is minimized to zero, the controller 56 excites the shutoff valve 53 and operates the pulse oscillator 23 and receives pulses produced from the photointerrupter 54.

When the oscillator 23 produces the pulses, the valve mechanism 22 discharges oil stepwise in response to each edge of the pulses. Furthermore, the shutoff valve 53 is excited to be closed. Accordingly, the oil discharged by the valve mechanism 22 is fed to the port 18f of the compression margin adjusting cylinder 18.

A relationship of $P_1 \cdot A_1 < P_2 \cdot A_2$ is formed between the force $P_1 \cdot A_1$ produced by the mold clamping cylinder 12 and the force $P_2 \cdot A_2$ produced by the compression margin adjusting cylinder 18. Accordingly, the piston 18c shown in FIG. 3 is moved back into the chamber 18b. Since the case 18g is moved up while pushing up the pin 19, the spacer ring 20, the intermediate member 21 and the movable die-plate 15, the compression margin s is increased.

The photointerrupter 54 produces pulses in accordance with the moving up of the movable die-plate 15. The controller 56 adds the pulses produced from the photointerrupter 54 to obtain the current value of the compression margin s. When the current value of the compression margin s reaches the set value of the compression margin s stored in the memory 58, the pulse oscillator 23 ceases operation.

As described above, when the valve mechanism 22 is not supplied with the pulses from the oscillator 23, since the flow ways 22c and 22d between the inlet 22a and the outlet 22b are completely cut off by the poppet mechanism and the shutoff valve 53 is also shut off, the path of retreat of the oil fed in the compression margin adjusting cylinder 18 is completely intercepted.

Since the mold clamping cylinder 12 adds the force of $P_1 \cdot A_1$ to the compression margin adjusting cylinder 18, the adjusting cylinder 18 fixes its length completely while satisfying the relation of $P_1 \cdot A_1 = P_2' \cdot A_2$, and the compression margin s is also fixed.

At this time, the pressure of the adjusting cylinder 18 varies from $P_2$ to $P_2'$, while the compression of oil in the adjusting cylinder 18 is in the numerical range in which the compression can be substantially neglected as compared with the compression margin s.

In this manner, when a proper compression margin is set, the controller 56 controls the injection operation of PMMA.

The temperature of the heater 55 for the metal mold is adjusted to 125° C. which is an example of a temperature before PMMA begins to harden under atmospheric pressure.

The temperature of the heater 36 for the injection cylinder 32 is adjusted to 190° C. which is an example of a temperature at which temperature PMMA does not begin to harden under any pressure.

Accordingly, PMMA in the injection cylinder 32 is completely melted.

Figure 7:
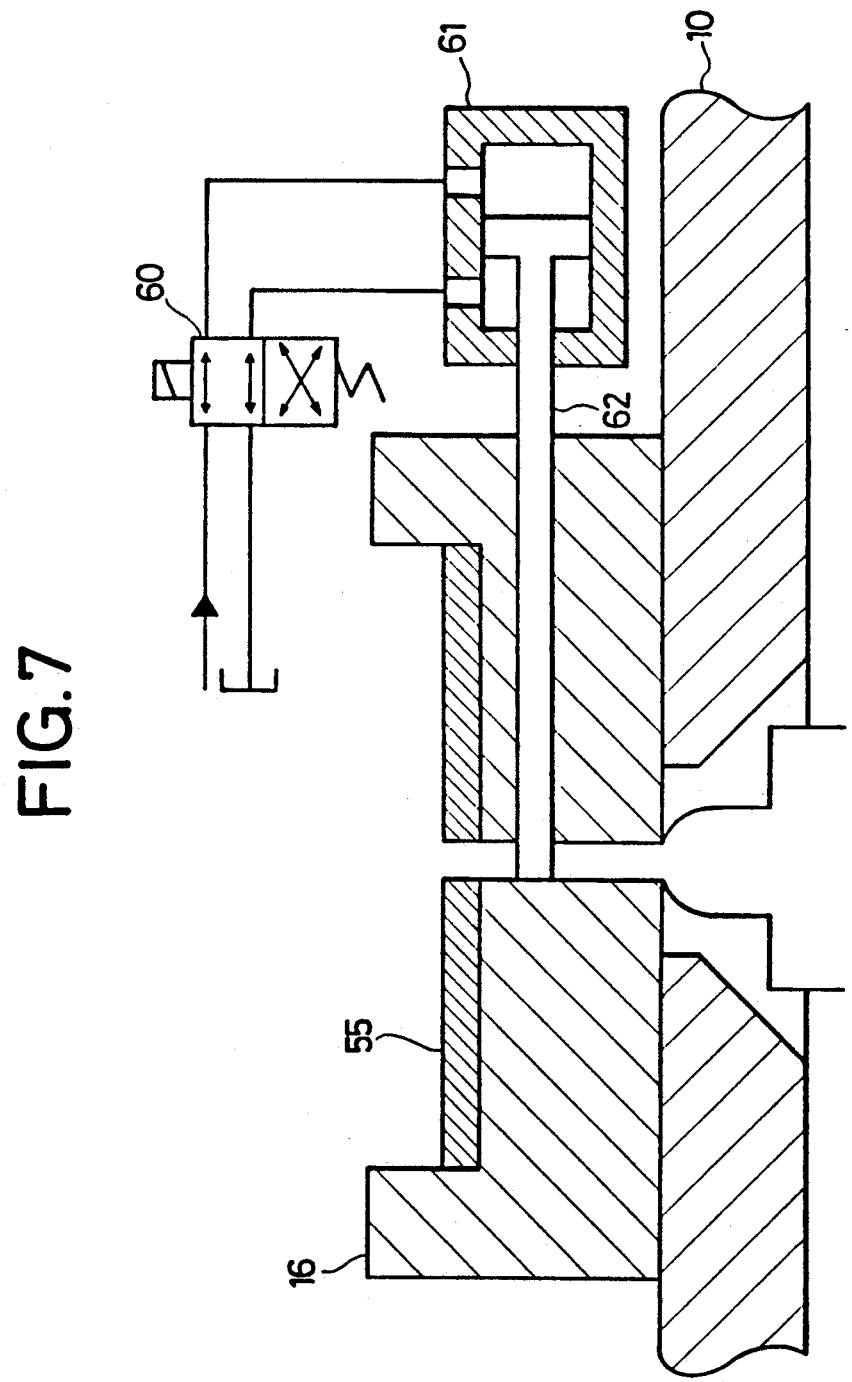
FIG. 7 is a sectional view of gate means.

The controller 56 deenergizes the solenoid valve 60 shown in FIG. 7 to release the sealing of the gate. Thereafter, the controller 56 operates the valve mechanism 51 to feed oil to the port 34a of the oil hydraulic cylinder 34. Accordingly, the plunger 33 is advanced in the injection cylinder 32 so that the melted PMMA is injected into the molding space formed by the movable metal mold 17 and the stationary metal mold 16.

The pressure in the adjusting cylinder 18 is slightly varied by the injection pressure at this time. However, the pressure in the cylinder 18 is a reactive force against the force exerted between the stationary die-plate 10 and the movable die-plate 15 and does not depend on the external oil hydraulic circuit. Furthermore, since the injection pressure is extremely small, the compression margin s is hardly varied.

After completion of the injection, the solenoid valve 60 is excited to seal the gate. Thereafter, the shutoff valve 53 is deenergized to reduce the pressure of the adjusting cylinder 18 so that compression molding of PMMA can be attained.

The resin injected into the metal mold is rapidly cooled to 125° C. that is the initially set temperature by the heat exchange with the metal mold.

The detected value of the temperature sensor $TS_2$ in the metal mold rises at a heat by injecting PMMA heated to 190° C., while the detected value of the sensor $TS_2$ is decreased again by cooling the PMMA.

As described above, PMMA does not harden under a pressure of 1 bar until the temperature thereof is decreased to about 125° C., while the PMMA begins to harden at about 150° C. under a pressure of 1000 bars.

In the embodiment, when the temperature sensor $TS_2$ detects the fact that the temperature of the PMMA reaches the temperature at which temperature the PMMA does not begin to harden still under a lower pressure but the PMMA begins to harden under application of the pressure, the valve mechanism 50 is controlled to suddenly increase the mold clamping force of the cylinder 12 so that the PMMA in the metal mold is pressurized at a heat to obtain the dynamic rigidity larger than that of the glass transition point with a slight reduction of the temperature.

Figure 8:
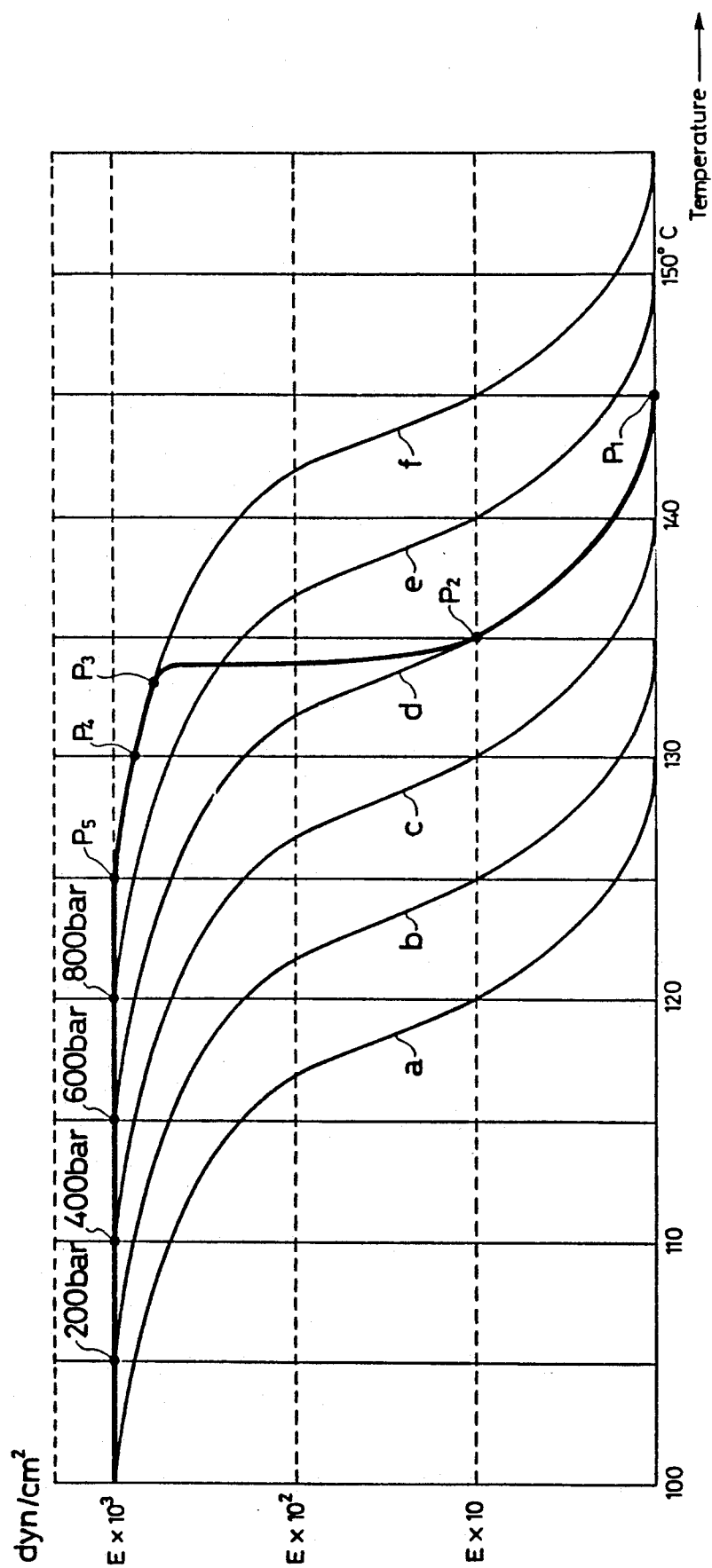
FIG. 8 is a graph showing a control characteristic in molding.

A curve shown by the thick line of FIG. 8 shows an example of a control curve of the temperature and the pressure upon hardening.

When PMMA is injected into the metal mold, the temperature of PMMA is reduced to 145° C. after a while from the gate sealing. When the size of the product is large, a case where the temperature of the resin is partially reduced to 145° C. before the gate sealing is considered, while in this case the injection speed is increased or the initial temperature of the metal mold is set to a temperature higher than 125° C. to control so that each of PMMA is cooled to about 145° C. uniformly.

When PMMA has been cooled about 145° C. under atmospheric pressure, the PMMA has been completely melted and accordingly, a pressure is applied to each portion of PMMA uniformly.

In the embodiment, while PMMA is in the range of temperature in which PMMA maintains its completely melted state, the pressure applied to the PMMA is suddenly increased so that the dynamic rigidity thereof is suddenly increased during a slight reduction of the temperature of the PMMA.

When the detected temperature of the sensor $TS_2$ reaches 145° C. (point $p_1$ of FIG. 8), the controller 56 controls the valve mechanism 50 to increase the pressure applied to the port 12a of the mold clamping cylinder 12 so that pressure of, for example, 600 bars is applied to the PMMA in the metal mold.

Thus, the dynamic rigidity of the PMMA is increased by the applied pressure thereto as described above and the dynamic rigidity reaches $E \times 10$ (dyn/cm$^2$) which is a state just before the glass transition point when PMMA is cooled to 135° C. (point $p_2$ of FIG. 8). E is a coefficient which depends on the resin used.

When the temperature sensor $TS_2$ detects that the PMMA has been cooled to 135° C., the controller 56 controls the valve mechanism 50 to increase the pressure applied to the port 12a of the mold clamping cylinder 12 so that a pressure of 1000 bars is applied to the PMMA in metal mold.

This application of pressure further increases the dynamic rigidity of PMMA and when PMMA has been cooled to 133° C. (point $p_3$ of FIG. 8) the dynamic rigidity exceeds the glass transition point completely. When cooled to 130° C. (point $p_4$ of FIG. 8) the PMMA has been almost completely hardened and when cooled to 125° C. (point $p_5$ of FIG. 8) the PMMA is completely solid.

With the control as described above, since the dynamic rigidity of the PMMA exceeds the glass transition point while the PMMA is cooled in a small temperature range of 2° C. from 135° C. to 133° C., the whole cooling time is extremely short and the operation efficiency is improved even if the cooling speed in the small temperature range is made sufficiently slow so that a deviation in the temperature does not occur in each portion of the PMMA while the glass transition point is exceeded.

The suitable cooling speed in exceeding the glass transition point is different depending on the temperature conductivity of the resin, the shape of a product and the like. When a molded product having a large size or deviation in thickness is obtained, the temperature of the metal mold is set to a higher temperature or the temperature of the metal mold is reduced stepwise so that the deviation in temperature of each portion of the resin is small.

The PMMA is completely solidified at the temperature of 125° C. in the applied state of pressure of 1000 bars as described above. However, as apparent from FIGS. 1 and 8, the temperature of 125° C. is a temperature at which PMMA begins to harden slightly under atmospheric pressure. Accordingly, when PMMA being in the applied state of pressure is returned to atmospheric pressure state, the PMMA is softened again. Therefore, in order to extract the molded product, PMMA must be cooled to the temperature (that is, 100° C.) at which PMMA is completely solid under atmospheric pressure.

Accordingly, in the embodiment, the set temperature in the metal mold by the heater 55 is reduced stepwise to cool PMMA to 100° C. which is the extraction temperature in the mold clamping state in which the pressure is applied to the port 12a of the mold clamping cylinder 12 by the valve mechanism 50, while if the high pressure of 1000 bars is continuously applied to the PMMA in the solid state, plastic deformation occurs in the molded product.

As described above, when the PMMA has certain dynamic rigidity, the temperature of the PMMA is varied by 0.025° C. each time the applied pressure is varied by 1 bar.

Accordingly, the controller 56 controls the valve mechanism 50 while watching the detected temperature in the metal mold by the temperature sensor $TS_2$. Thus, each time the temperature of the PMMA is reduced by 1° C., the pressure applied to PMMA is reduced by 40 bars so that the molded product is obtained while the dynamic rigidity of the PMMA is maintained uniform.

The control of temperature and pressure as described above is performed by a known command value following control.

As described above, in the case where the pressure is reduced by 40 bars each time the temperature is reduced by 1° C., the pressure is reduced to 800 bars at 120° C., 600 bars at 115° C., 400 bars at 110° C., 200 bars at 105° C. and atmospheric pressure at 100° C.

When the molding operation is completed as described above, the controller 56 controls the valve mechanism 50 to feed oil to the port 12b of the mold clamping cylinder 12 so that the movable metal mold 17 is lifted and the molded product is extracted by a known ejector mechanism not shown.

The essence of the present invention resides in that resin which is in the melted state under atmospheric pressure but is set to the temperature at which the resin begins to harden by the application of pressure is applied with pressure and is hardened to exceed the glass transition point at a slight reduction of temperature. However, the temperature of the resin before injection, the initial set temperature of the metal mold, the temperature in the beginning of the application of pressure, the applied pressure and the like are different depending on the kind of resin, the size of the molded product, the shape of the product and the like and the molding time is also different depending on these condition. It is necessary to decide the optimum molding conditions for each molded product.

In the above embodiment, reference is made to the actual example concerning the measuring and injecting device and the plasticizing device, while the configuration thereof is not limited as long as the temperature of the resin before injection can be controlled properly and the amount of resin can be also measured exactly.

Furthermore, the above embodiment makes reference to the mechanism for forming the compression margin, while the configuration thereof is not also limited thereto as long as the accuracy of adjusting the compression margin can be satisfied.

As described above, in the present invention, since, when the injected resin has been cooled to the temperature at which the resin is maintained in the melted state under atmospheric pressure and begins to be hardened by the application of pressure, the resin is pressurized to be hardened to obtain the dynamic rigidity larger than that of the glass transition point, the resin exceeds the glass transition point while the temperature thereof is reduced slightly.

Accordingly, since the temperature reduction necessary to exceed the glass transition point in the molding of resin is extremely small, even if the cooling speed is made slow so that the temperature deviation does not occur in each portion of the resin during this process, the time required to exceed the glass transition point is small.

According to the present invention, since the initial set temperature of the metal mold is set to a temperature higher than that at which resin begins to be hardened under atmospheric pressure and the resin before the beginning of application of pressure is completely melted state, the pressure is applied to each portion of the resin uniformly and solidified portions and melted portions are not mixedly produced in the resin in the molding. Accordingly, it is hard to produce partially plastic deformation and lack of uniformity of the inner composition and the molded product superior to the uniformity of the inner composition can be easily obtained.

Further, in the present invention, since the temperature of the resin and the pressure applied to the resin are controlled so that increase of the dynamic rigidity due to the temperature reduction and decrease of the dynamic rigidity due to the pressure reduction are canceled each other while the resin which has been hardened is cooled to the temperature for extraction, the resin in the cooling maintains a constant dynamic rigidity and the property of the molded product is not deteriorated in the cooling.

We claim:

1. An injection molding method with compression in which a predetermined amount of melted thermoplastic resin is injected into a metal mold formed with a molding space and the thermoplastic resin injected into the metal mold is cooled while controlling a pressure applied to the resin so that a molded product is obtained, comprising:

injecting the predetermined amount of melted thermoplastic resin into the metal mold formed with the molding space larger than a volume of the molded product, a temperature of the metal mold having been previously set to a temperature which is higher than a temperature at which the resin begins to harden under atmospheric pressure;

hardening the thermoplastic resin by increasing the pressure applied to the thermoplastic resin injected into the metal mold before the thermoplastic resin injected into the metal mold is cooled to the temperature at which the resin begins to harden under atmospheric pressure;

cooling the thermoplastic resin while maintaining the pressure applied thereto to a temperature at which a dynamic rigidity of the thermoplastic resin reaches a dynamic rigidity of the resin under room temperature and atmospheric pressure while maintaining the pressure applied to the resin; and further cooling the thermoplastic resin to an extraction temperature while also reducing the pressure applied to the resin until a further increase of the dynamic rigidity due to cooling ceases, to thereby obtain the molded product.

2. An injection molding method with compression in which a predetermined amount of melted thermoplastic resin is injected into a metal mold formed with a molding space capable of effecting temperature control and pressure control and the thermoplastic resin injected into the metal mold is cooled while controlling a pressure applied to the resin so that a molded product is obtained, comprising:

injecting the predetermined amount of melted thermoplastic resin into the metal mold formed with the molding space larger than a volume of the molded product, a temperature of the metal mold having been previously set to a temperature which is higher than a temperature at which the resin begins to harden under atmospheric pressure;

shifting the glass transition temperature to a higher temperature to harden the thermoplastic resin by increasing the pressure applied to the thermoplastic resin injected into the metal mold before the thermoplastic resin injected into the metal mold is cooled to the temperature at which the resin begins to harden under atmospheric pressure;

cooling the thermoplastic resin while maintaining the pressure applied thereto to a temperature at which a dynamic rigidity of the thermoplastic resin reaches a dynamic rigidity of the resin under room temperature and atmospheric pressure while maintaining the pressure applied to the resin; and further cooling the thermoplastic resin to an extraction temperature while also reducing the pressure applied to the resin until a further increase of the dynamic rigidity due to cooling ceases, to thereby obtain the molded product.

3. An injection molding method with compression in which a predetermined amount of melted thermoplastic resin is injected into a metal mold formed with a molding space capable of effecting a temperature control and pressure control and the thermoplastic resin injected into the metal mold is cooled while controlling a pressure applied to the resin so that a molded product is obtained, comprising:

injecting the melted thermoplastic resin having a mass equal to that of the molded product into the metal mold formed with the molding space larger than a volume of the molded product, a temperature of the metal mold having been previously set to a temperature which is higher than a temperature at which the resin begins to harden under atmospheric pressure;

shifting the glass transition temperature to a temperature which is higher than a current temperature of the thermoplastic resin to harden the thermoplastic resin by increasing the pressure applied to the thermoplastic resin injected into the metal mold before the thermoplastic resin injected into the metal mold is cooled to the temperature at which the resin begins to harden under atmospheric pressure;

cooling the thermoplastic resin while maintaining the pressure applied thereto to a temperature at which a dynamic rigidity of the thermoplastic resin reaches a dynamic rigidity of the resin under room temperature and atmospheric pressure while maintaining the pressure applied to the resin; and further cooling the thermoplastic resin to an extraction temperature while also reducing the pressure applied to the resin until a further increase of the dynamic rigidity due to cooling ceases and the dynamic rigidity of the resin is maintained at the dynamic rigidity under room temperature and atmospheric pressure, to thereby obtain the molded product.

* * * * *